3,058,418
MEANS FOR LOADING SEISMIC EXPLOSIVES

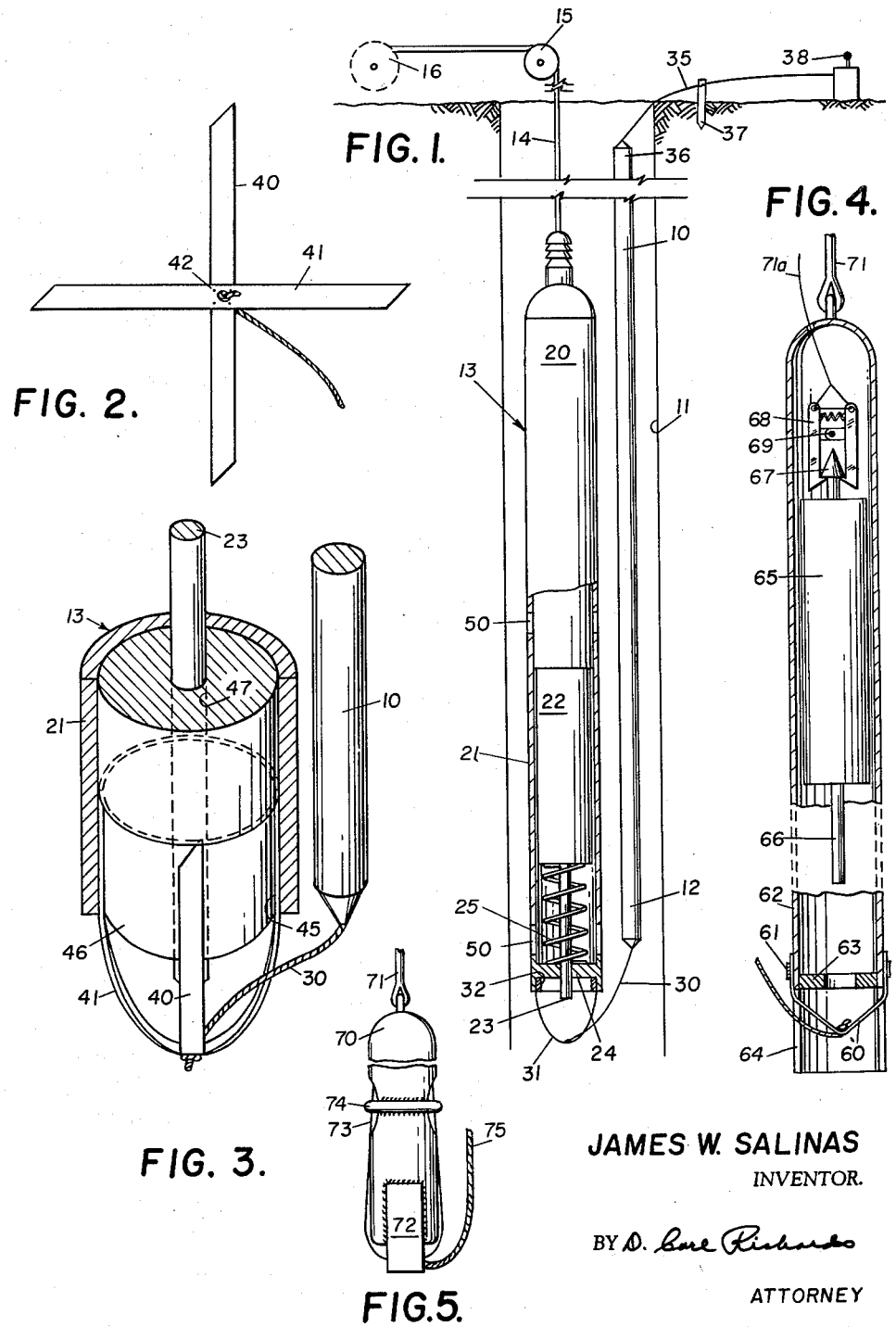
Oct. 16, 1962 — J. W. SALINAS — 3,058,418
MEANS FOR LOADING SEISMIC EXPLOSIVES
Filed March 28, 1957
JAMES W. SALINAS
INVENTOR.
BY D. Carl Richards
ATTORNEY

James W. Salinas, Schulenburg, Tex., assignor, by mesne assignments, to Socony Mobil Oil Company, Inc., New York, N.Y., a corporation of New York
Filed Mar. 28, 1957, Ser. No. 649,052
8 Claims. (Cl. 102—21.8)

This invention relates to seismic exploration and more particularly to the placement of explosive charges as predetermined depths in a shot hole.

In the co-pending application of Albert W. Musgrave and James C. Eley, co-workers of applicant, Serial No. 482,196, filed January 17, 1955, now Patent No. 2,992,694, issued July 18, 1961, there is disclosed a new seismic explosive of a type with which applicant has been concerned in connection with proper placement thereof. The explosive of the above-identified application includes an elongated, water-impervious tube filled with explosive materials of preselected character. Such tubular charges of 200 feet in length are suspended in a borehole and thus continuously distribute explosive energy over a substantial earth section. The explosive preferably is detonated from the upper end. The seismic wave progressively moves downward to produce a cumulative effect at the bottom of the charge and to minimize upwardly traveling energy.

It is desirable in each case to be certain that the bottom end of each charge is at a predetermined depth. In water and mud filled shot holes it has been found difficult to make certain the disposition of the charge. Such uncertainty hinders interpretation of resultant seismic records.

In accordance with the present invention there is provided a system for loading a shot hole with an explosive charge, particularly of string-like character, whereby the charge may be positively loaded with the bottom thereof at a predetermined depth. More particularly, there is provided a system for loading a seismic explosive where the explosive is characterized by having a lead extending to the earth's surface. A loading weight is adapted to be lowered into the bore hole. A coupling is provided between the loading weight and the lower end of the seismic explosive. Means are provided responsive to a predetermined movement of the weight for releasing the charge from the weight. In a preferred embodiment, an expandable charge anchor is adapted to be secured to the lower end of the loading weight. A mass resiliently supported in the loading weight is provided to disengage the charge anchor from the weight as upon upward acceleration of the loading weight.

For further objects and advantages of the invention and for a more complete understanding thereof, reference may now be had to the following description taken in conjunction with the accompanying drawings in which:

FIG. 1 illustrates a charge loading device in a borehole;
FIG. 2 illustrates an expandable charge anchor;
FIG. 3 illustrates the lower end of a loading weight;
FIG. 4 is a modified loading device; and
FIG. 5 is a further modification of the invention.

Referring to FIG. 1, there is illustrated an elongated rope-like charge 10 of the type disclosed and claimed in the above-identified co-pending application of Musgrave et al. The charge 10 is to be lowered into a borehole 11 with the bottom 12 of the explosive charge at a predetermined depth in the hole. The system for loading the explosive includes a loading instrument 13 which is supported in borehole 11 by a cable 14. Cable 14 is threaded over a surface pulley or sheave 15 and coupled to a drive reel or winch represented by the dotted circle 16. The loading weight 13 has an upper section 20 which may be solid. A lower section 21 preferably is hollow. A cylindrical mass or weight 22 positioned inside section 21 is provided with a plunger or shaft 23 which extends downward. The lower end of section 21 is provided with a bulkhead 24 through which the plunger 23 extends. A helical spring 25 is positioned in the lower end of section 21 and is supported on the upper surface of bulkhead 24.

A rope or cord 30, normally tied at one end to the lower end 12 of charge 10, is secured to a cup structure 31. The cup structure 31 facing upwardly has the lip 32 thereof frictionally engaged by, or otherwise releasably fastened to, the lower end of section 21 immediately below bulkhead 24.

Elongated charges of the type illustrated ordinarily will be provided in substantial lengths of the order of several hundred feet in a suitable carton. The string or cord 30 will be tied to the free end of the string charge. Preparatory to loading a charge, the loading weight 13 is fitted with an expendable cup such as cup 31. A secure connection preferably will be provided between cup 31 and the lower end of the loading weight 13. Thereupon the loading weight may be lowered into the borehole pulling the string charge behind it as the charge is payed into the borehole. When a measurement of the length of cable 14 payed into the borehole indicates that the charge is at a desired depth, an abrupt deceleration or a sharp upward movement of the loading weight 13 will produce relative movement between the frame or casing of the loading weight 13 and the spring supported mass 22. This is due to the inertia of the mass 22 and the resilience afforded by the spring 25. As such relative movement occurs, the shaft or plunger 23 moves downwardly with respect to cup 31, dislodging or freeing it from the lower end of the weight whereupon the loading weight 13 may be removed from the borehole.

At this point the explosive charge is ready to be fired for the generation of seismic waves. Ordinarily a firing line 35 leading from a detonating cap in the upper end 36 of charge 10 will be secured to an anchor stake 37 and will then extend to a suitable blasting device represented by the blaster 38.

In accordance with one aspect of the invention, the cup or anchor element 31 is formed of a fabric or plastic material which may be clipped in the bottom of the loading tool or weight 13. In a preferred embodiment, an expandable shot anchor is employed which, upon release of the loading tool 13, will engage the walls of the borehole to fix the bottom of the charge at a predetermined depth. Such an anchor system is illustrated in FIGS. 2 and 3.

The anchor is of simple construction and comprises a pair of flat, spring steel elements 40 and 41 which are secured as by rivets 42 in the form of a cross. The ends of the elements 40 and 41 preferably are beveled or pointed. FIG. 3 is a view of the lower end of the loading weight 13 fitted with a shot anchor.

The shot anchor as shown in FIG. 3 is secured to the lower end of the loading weight 13. The lower end of loading weight 13 in this form is provided with an elongated, cylindrical recess 45. The latter recess may be formed by fitting a cylinder 46 in the lower end of the loading weight. As illustrated in FIG. 3, the lower portion 21 has been cut away and is shown in section. The lower end of cylinder or insert 46 has slightly smaller diameter than the upper portion. The shot anchor is folded or cupped for insertion into the lower end of the loading weight 13. The cylindrical recess between the lower end of insert 46 and the walls of housing 21 preferably will be such that the flat spring elements 40 and 41 will be slightly deformed as they are forced into the recess, thereby frictionally to be secured. As the ends of elements 40 and 41 are inserted in the bottom of the loading weight, they frictionally engage diametrically opposed points in the insert-receiving zones. Insert 46 is provided with a cylindrical opening 47 through which the plunger 23 extends.

Cord 30 may conveniently be passed through a hole at the mid-point of elements 40 and 41 and knotted. The upper surface of insert 46 provides a shoulder or base for supporting the spring 25 (FIG. 1). Thus when the loading weight 13 is accelerated upward, plunger 23 moves downward relative to spring elements 40 and 41 to disengage the ends thereof from the circular groove 45. Thereupon springs 40 and 41 expand outwardly to engage the borehole walls and oppose any upward movement of the charge 10. The loading tool is then removed from the borehole.

It may be desirable to provide ports 50, FIG. 1, in the walls of the cylindrical housing 21 above and below the mass 22 to provide paths for fluid flow from above and below the cylinder as the charge anchor is released. The spring-supported mass 22, however, need not necessarily be fitted in its housing 21 so closely that the fluids cannot by-pass the mass without materially impeding movement thereof as the charge anchor is released.

In FIGS. 2 and 3, an anchor device comprising the crossed springs 40 and 41 has been illustrated secured to the lower end of the loading tool and protruding therebelow. Nevertheless a single anchor spring element has been found to be satisfactory for anchoring the charge after release from the loading tool. Further, it has been necessary in some cases to work the loading tool slowly through tight sections of the shot hole. In cases where a bridge is formed in a shot hole it is necessary to bump or "spud" the bridge downhole until the desired depth is attained. When this is the case, it is preferred that the lower end of the tool extend below the charge anchor generally as illustrated in FIG. 4. A single spring 60 is secured under a strap or ring 61 which extends around the periphery of the cylindrical loading tool 62. The lower end of the loading tool 62 is provided with slots or channels 64 at diametrically opposed points so that the lowermost portion of anchor element 60 will be well up within the tool 62. A disk 63 is secured in the lower end of the tool 62 immediately above the slots therein to provide a stop for the releasing mass 65.

In the embodiment shown in FIG. 4 mass 65 is provided at the lower end with a plunger or shaft 66 which will strike and release the anchor 60 when mass 65 is dropped. A latching element 67 is provided at the upper end of mass 65. A spring biased latch 68 pivotally supported in the tool 62 on shaft 69 supports the mass 65 in the upper end of the loading tool. A cord or cable 71a which is threaded through the upper ends of the latch 68 extends to the surface of the earth along with the supporting cable 71. When tension is placed on the cord 71a, mass 65 is released to travel downwardly and force the anchor spring 60 from its latched position under ring 61. The anchor will then engage the adjacent borehole walls and the loading tool may then be removed by means of the supporting cable 71.

In FIG. 5 there is illustrated a further modification of the invention in which a loading weight 70 to be suspended in a borehole by a cable 71 is provided at the lower end thereof with a pair of extensions, one of which, the extension 72, is shown welded to the side of the loading weight 70. The extension or strap 72 along with a similar strap on the other side of the loading weight extends below the end of the loading weight 70 to form a channel to receive the charge anchor 73 which is formed by a single length of flat spring steel. The charge anchor 73 is bent in the shape of a U and is inserted under a ring 74 which is welded around the loading weight 70 at a point spaced slightly above the lower end of the weight. The ring 74 is welded or otherwise secured to the loading weight at points spaced from the end of the loading weight which points are in alignment with the straps or extensions 72. The sides of the loading weight 70 may be slightly milled or indented to provide a recess into which the upper ends of the charge anchor 73 may fit. A rope 75 secured at one end to the midpoint of charge anchor 73 extends upward to the lower end of the string charge, generally as shown in FIGS. 1 and 3.

In operation, preparatory to the loading the string charge the charge anchor 73 is inserted under ring 74 with the midsection thereof between the extensions such as extension 72. The charge is then lowered into the borehole until the lower end thereof is at the desired depth. An abrupt upward motion of the loading weight 70 forces the borehole fluids against the charge anchor 73 and causes the latter to be released from the loading weight 70 and to engage the walls of the borehole thereby to fix the depth of the lower end of the string charge.

While the invention has been described primarily in connection with loading elongated thin charges, other charges may also be loaded thereby. More conventional explosive charges used in seismic exploration are about 2 inches in diameter. In placing small portions of such charges it has been found difficult at times to locate the charge at an exact depth. The present invention may be employed in such instances where the charge and the loading weight both may be accommodated in a given borehole. Having described the foregoing invention in connection with the illustrated modifications, it will be understood that further modifications may suggest themselves to those skilled in the art and it is intended to cover such modifications as fall within the scope of the appended claims.

What is claimed is:

1. A system for loading a seismic explosive charge in a borehole where said charge has a lead for extending to the earth's surface the combination which comprises a loading weight, a pair of spring elements disposed mutually perpendicular to each other and adapted to have the ends thereof inserted into the lower end of said weight, means for coupling said elements to one end of said charge whereupon said weight will propel said charge downward through the borehole, a mass resiliently supported in the lower end of said weight and immediately above said spring elements, and a plunger extending from said mass and adapted to contact said spring elements upon upward acceleration of said weight for releasing said spring elements and fixing said charge at a predetermined depth in said borehole.

2. A system for loading a seismic explosive charge in a borehole where said charge has a lead for extending to the earth's surface the combination which comprises a loading weight having insert-receiving zones extending upwardly from the bottom thereof, a plurality of anchor elements each engaging said weight at diametrically opposed points in said zones, means for coupling each of said elements to one end of said charge whereupon said weight will propel said charge downward through the borehole, a mass resiliently supported in the lower end of said weight and immediately above said elements, and a plunger extending from said mass and adapted to contact said elements upon upward acceleration of said weight for releasing said elements whereby said elements extend into engagement with the wall of said borehole and fix said charge at a predetermined depth in said borehole.

3. A tool for loading in shot holes seismic explosives of the type having a lead for extending to the earth's surface comprising a loading weight, coupling means for mechanically coupling the lower end of said loading weight to the lower end of the explosive, cable means for connection to the upper end of said weight for lowering the loading weight into the bore hole for pulling the explosive down to a predetermined location in the bore hole, said weight having a chamber therein, and a mass within said chamber and movable relative to said loading weight and applying a force to said coupling means for uncoupling said loading weight from the explosive when the explosive has been placed in said predetermined location.

4. A system for loading a seismic explosive charge in a borehole where the charge has a lead for extending to the earth's surface comprising a loading weight for pulling the explosive charge down the borehole, means coupled to said weight for lowering said weight into the borehole, means operatively associated with said weight and the charge for coupling the lower end of the charge to the lower end of said weight for pulling the explosive downward in the borehole, and means at least in part between the upper end of said weight and said charge coupling means and responsive to predetermined upward movement of said weight and operative due to said upward movement to apply a force to said coupling means independent of said weight and in a downward direction to release at least a portion of said coupling means and the charge from said loading weight for engagement of said portion of said coupling means with the wall structure of the borehole to secure the explosive charge in the borehole and for removal of said loading weight from the borehole prior to detonation of the explosive charge.

5. A system for loading a seismic explosive in a borehole where the explosive has a lead for extending to the earth's surface comprising a loading weight, an expandable charge anchor, means on said loading weight for securing said anchor to the lower end of said weight, coupling means for connecting the lower end of the explosive to said anchor for application of force by said weight to said lower end of the explosive by way of said anchor to pull the explosive downward in the borehole, and means at least in part between the upper end of said weight and said anchor and responsive to predetermined upward movement of said weight and operative due to said upward movement to apply a force to said anchor independent of said weight to release said anchor from said weight for engagement of the anchor with the borehole walls to locate the explosive in position in the borehole and for removal of said weight from the borehole prior to detonation of the explosive.

6. A system for loading a seismic explosive charge in a borehole where the charge has a lead for extending to the earth's surface comprising a loading weight, an expandable charge anchor adapted to be secured to the lower end of said weight, coupling means connecting at one end to said anchor and connected at another end to one end of the charge whereupon said weight will pull the charge downward through the borehole, a mass, said weight having a cavity in its lower end for containing said mass, means within said cavity for resiliently supporting said mass in the lower end of said weight and immediately above said anchor, and an element connected to said mass and adapted to contact said anchor, said mass being responsive to upward acceleration of said weight to move said element and said mass relative to said weight and against the force of said supporting means to contact said element for releasing said anchor to separate said weight from said anchor and to fix the charge at a predetermined depth in the borehole.

7. In a system for loading in a borehole a seismic explosive charge and an elongated charge anchor connected to a lower end of the charge, said anchor charge having ends for engaging the borehole walls, the combination which comprises an elongate loading weight having a cable attaching means at one end for connection to a cable for lowering said weight into a borehole for pulling the charge and the anchor down the borehole, diametrically opposed and spaced extensions secured to said weight at an opposite end thereof providing a bifurcated structure and extending below said opposite end for receiving in the opening therebetween a body portion of the charge anchor, and a ring secured to the outer surface of said loading weight at a point on said weight spaced from the ends of said extensions, opposite portions of the outer surface of said weight adjacent said ring being recessed to provide spaces between the surface of said weight and said ring and in alignment with the opening between said extensions for receiving and frictionally securing said ends of the charge anchor to said weight.

8. In a system for loading in a borehole a seismic explosive charge and a charge anchor connected to one end of the charge wherein the charge anchor is comprised of a resilient strip of spring metal having sharpened ends which when extended dig into a surrounding borehole wall to anchor the charge at a predetermined depth in the borehole, the combination which comprises an elongate loading weight having cable attaching means at one end for connection to a cable for lowering said weight into a borehole for pulling the charge and the anchor down the borehole, diametrically opposed spaced extensions secured to an opposite end of said loading weight providing a bifurcated structure for receiving in the opening therebetween a body portion of the charge anchor, and means located on said weight adjacent the periphery thereof and spaced from said opposite end for receiving and frictionally securing the ends of the charge anchor spring to said weight.

References Cited in the file of this patent

UNITED STATES PATENTS

| | | |
|---|---|---|
| 156,673 | Peck | Nov. 10, 1874 |
| 1,005,138 | Bartlett | Oct. 10, 1911 |
| 1,258,834 | Waitz | Mar. 12, 1918 |
| 2,047,774 | Greene | July 14, 1936 |
| 2,450,366 | Williams | Sept. 28, 1948 |
| 2,550,563 | Hughes | Apr. 24, 1951 |
| 2,755,878 | Smith | July 24, 1956 |